US012567288B2

(12) United States Patent
Kumazaki

(10) Patent No.: US 12,567,288 B2
(45) Date of Patent: Mar. 3, 2026

(54) VEHICLE MOTION SCORING DEVICE, METHOD, AND COMPUTER PROGRAM FOR SCORING VEHICLE MOTION

(71) Applicant: TOYOTA JIDOSHA KABUSHIKI KAISHA, Toyota (JP)

(72) Inventor: Kenta Kumazaki, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 18/586,062

(22) Filed: Feb. 23, 2024

(65) Prior Publication Data

US 2024/0290140 A1 Aug. 29, 2024

(30) Foreign Application Priority Data

Feb. 28, 2023 (JP) ................................. 2023-030155

(51) Int. Cl.

| | |
|---|---|
| ***G08G 1/16*** | (2006.01) |
| ***G07C 5/00*** | (2006.01) |
| ***G07C 5/08*** | (2006.01) |
| ***G08G 5/80*** | (2025.01) |
| ***G08G 7/02*** | (2006.01) |

(52) U.S. Cl.

CPC ........... *G07C 5/008* (2013.01); *G07C 5/0808* (2013.01)

(58) Field of Classification Search

CPC ......... G07C 5/008; G07C 5/0808; G06N 3/08

See application file for complete search history.

(56) References Cited

U.S. PATENT DOCUMENTS

| | | | | |
|---|---|---|---|---|
| 2014/0212849 | A1 | 7/2014 | Naiwala et al. | |
| 2020/0164888 | A1* | 5/2020 | Hiramatsu | G05D 1/0088 |
| 2020/0180614 | A1 | 6/2020 | Goto et al. | |
| 2020/0284603 | A1 | 9/2020 | Sumikawa et al. | |
| 2022/0101752 | A1 | 3/2022 | Sumikawa et al. | |

FOREIGN PATENT DOCUMENTS

| | | | |
|---|---|---|---|
| JP | 2013-069251 | A | 4/2013 |
| JP | 2017-084110 | A | 5/2017 |
| JP | 2020-026189 | A | 2/2020 |

(Continued)

OTHER PUBLICATIONS

JP202488047 machine translation (Year: 2022).*

*Primary Examiner* — Anne Marie Antonucci
*Assistant Examiner* — Jingli Wang
(74) *Attorney, Agent, or Firm* — Dinsmore & Shohl LLP

(57) ABSTRACT

A vehicle motion scoring device includes a processor configured to calculate at least one of a degree of variations in a distribution of a motion index or a maximum of the motion index, based on vehicle motion information indicating motion of a vehicle traveling along a predetermined road section, and set a lower score to the vehicle motion information as a calculated value of the degree of variations in the distribution of the motion index or the maximum of the motion index is greater. The motion index includes at least one of acceleration or deceleration of the vehicle, an amount of change in the acceleration or deceleration of the vehicle per unit time, an amount of change in a travel direction of the vehicle, or an amount of change in the travel direction of the vehicle per unit time.

3 Claims, 5 Drawing Sheets

(56) References Cited

FOREIGN PATENT DOCUMENTS

| | | | | |
|---|---|---|---|---|
| JP | 2020-144091 | A | | 9/2020 |
| JP | 2022-054982 | A | | 4/2022 |
| JP | 202488047 | | * | 12/2022 |
| WO | 2019/021429 | A1 | | 1/2019 |
| WO | 2019/044641 | A1 | | 3/2019 |

* cited by examiner

VEHICLE MOTION SCORING DEVICE, METHOD, AND COMPUTER PROGRAM FOR SCORING VEHICLE MOTION

CROSS-REFERENCE TO RELATED APPLICATIONS

This application claims priority to Japanese Patent Application No. 2023-030155 filed on Feb. 28, 2023, the entire contents of which are herein incorporated by reference.

FIELD

The present disclosure relates to a vehicle motion scoring device, a method, and a computer program for scoring vehicle motion.

BACKGROUND

It has been proposed to train a model for determining control information of a vehicle in autonomous driving control of the vehicle, based on motion of a vehicle manually driven by a driver (see International Publication WO2019/021429A).

A driving assistance method disclosed in WO2019/021429A includes learning driving characteristics of a driver's manual driving, and reflecting the result of this learning in driving characteristics of autonomous driving control. To this end, the driving assistance method includes detecting driving characteristics of a region where an autonomous vehicle travels, adjusting the result of learning according to the detected regional driving characteristics, and executing autonomous driving control, based on the adjusted result of learning.

SUMMARY

To train a model so that the model can output appropriate control information, it is desirable to use vehicle motion information indicating motion of an appropriately driven vehicle for training the model. However, even when vehicles travel along the same road section, motion of the individual vehicles varies depending on drivers or conditions around the vehicles during travel. For this reason, motion of a vehicle indicated by vehicle motion information may be unsuitable for training a model. On the other hand, scoring individual pieces of vehicle motion information manually requires countless man-hours. It is therefore desirable to automatically estimate how much an individual piece of vehicle motion information is suitable for training a model.

It is an object of the present disclosure to provide a vehicle motion scoring device that can score motion of a vehicle appropriately.

According to an embodiment, a vehicle motion scoring device is provided. The vehicle motion scoring device includes a processor configured to: calculate at least one of a degree of variations in a distribution of a motion index or a maximum of the motion index, based on vehicle motion information indicating motion of a vehicle traveling along a predetermined road section, and set a lower score to the vehicle motion information as a calculated value of the degree of variations in the distribution of the motion index or the maximum of the motion index is greater. The motion index includes at least one of acceleration or deceleration of the vehicle, an amount of change in the acceleration or deceleration of the vehicle per unit time, an amount of change in a travel direction of the vehicle, or an amount of change in the travel direction of the vehicle per unit time.

According to another embodiment, a method for scoring vehicle motion is provided. The method includes calculating at least one of a degree of variations in a distribution of a motion index or a maximum of the motion index, based on vehicle motion information indicating motion of a vehicle traveling along a predetermined road section; and setting a lower score to the vehicle motion information as a calculated value of the degree of variations in the distribution of the motion index or the maximum of the motion index is greater. The motion index includes at least one of acceleration or deceleration of the vehicle, an amount of change in the acceleration or deceleration of the vehicle per unit time, an amount of change in a travel direction of the vehicle, or an amount of change in the travel direction of the vehicle per unit time.

According to still another embodiment, a non-transitory recording medium that stores a computer program for scoring vehicle motion is provided. The computer program includes instructions causing a computer to execute a process including calculating at least one of a degree of variations in a distribution of a motion index or a maximum of the motion index, based on vehicle motion information indicating motion of a vehicle traveling along a predetermined road section; and setting a lower score to the vehicle motion information as a calculated value of the degree of variations in the distribution of the motion index or the maximum of the motion index is greater. The motion index includes at least one of acceleration or deceleration of the vehicle, an amount of change in the acceleration or deceleration of the vehicle per unit time, an amount of change in a travel direction of the vehicle, or an amount of change in the travel direction of the vehicle per unit time.

The vehicle motion scoring device according to the present disclosure has an effect of being able to score motion of a vehicle appropriately.

DESCRIPTION OF EMBODIMENTS

A vehicle motion scoring device, a method for scoring vehicle motion executed by the vehicle motion scoring device, and a computer program for scoring vehicle motion will now be described with reference to the attached drawings. The vehicle motion scoring device sets a score of vehicle motion information indicating motion of a vehicle traveling along a predetermined road section. To this end, the vehicle motion scoring device calculates at least one of the degree of variations in the distribution of a motion index or a maximum of the motion index, based on the vehicle motion information. The vehicle motion scoring device sets a lower score to the vehicle motion information as the degree of variations in the distribution of the motion index or the maximum of the motion index is greater. The motion index is an index indicating travel motion of the vehicle, and includes at least one of acceleration or deceleration of the vehicle, the amount of change in the acceleration or deceleration per unit time, the amount of change in a travel direction of the vehicle, or the amount of change in the travel direction of the vehicle per unit time.

The vehicle motion information is used, for example, as training data for training a control model used for autonomous driving control of a vehicle. Such a control model is configured, for example, as a "deep neural network (DNN)." The control model, into which information on a target road section represented in a map (the radius of curvature, lane width, regulation speed, etc.) or an image obtained by taking a picture of the road section with a vehicle-mounted camera is inputted, outputs a planned trajectory of the vehicle or control information of the vehicle. For this reason, a score that is set to vehicle motion information indicates, for example, how much the vehicle motion information is useful as training data for the control model. Thus, for example, only pieces of vehicle motion information having scores not less than a certain value are used as training data. Information included in the vehicle motion information, such as information on accelerator positions, brake pedal force, and steering angles, or trajectories of the vehicle, is used for training the control model.

Figure 1:
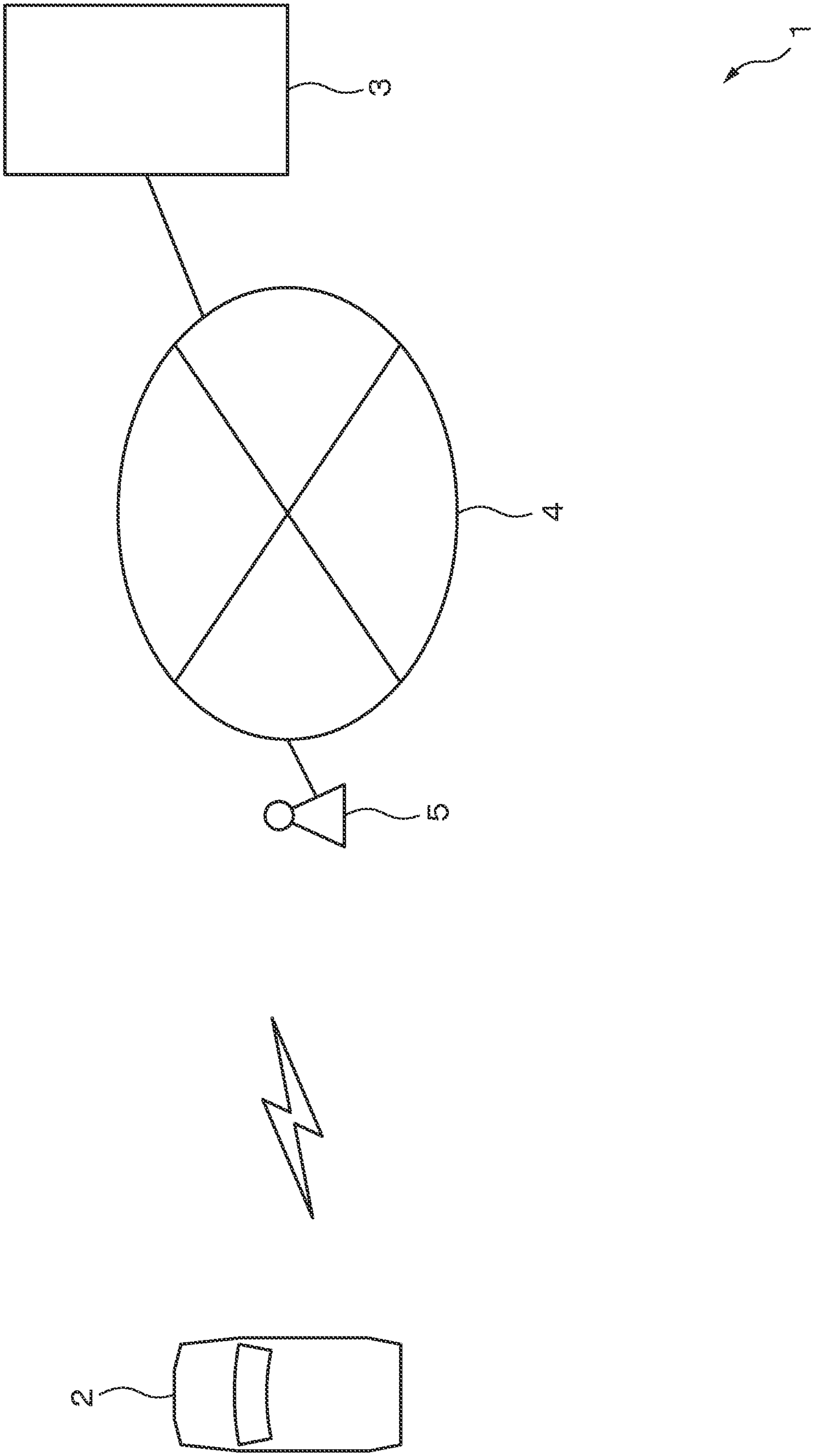
FIG. 1 schematically illustrates the configuration of a vehicle motion scoring system equipped with a vehicle motion scoring device.

FIG. 1 schematically illustrates the configuration of a vehicle motion scoring system equipped with the vehicle motion scoring device. In the present embodiment, the vehicle motion scoring system 1 includes at least one vehicle 2 and a server 3, which is an example of the vehicle motion scoring device. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2, but the vehicle motion scoring system 1 may include multiple vehicles 2. FIG. 1 also illustrates only a single wireless base station 5, but the communication network 4 may be connected with multiple wireless base stations 5.

The vehicle 2 includes at least one vehicle motion sensor, a GPS receiver, a vehicle motion recorder, and a wireless communication terminal.

The vehicle motion sensor is a sensor for detecting motion of the vehicle 2, and includes, for example, at least one of a speed sensor, an acceleration sensor, a gyro sensor, a sensor for detecting the accelerator position, a sensor for detecting brake pedal force, or a sensor for detecting the steering angle. Every time a motion sensor signal indicating motion of the vehicle 2 is generated, the vehicle motion sensor outputs the generated motion sensor signal to the vehicle motion recorder. The motion sensor signal indicates at least one of a speed, an acceleration or deceleration in a travel direction (hereinafter "front-back G"), an acceleration or deceleration in a direction perpendicular to the travel direction (hereinafter "left-right G"), an angular velocity in the yaw direction, an accelerator position, brake pedal force, and a steering angle.

The GPS receiver receives GPS signals from GPS satellites at predetermined intervals, and determines the position of the vehicle 2, based on the received GPS signals. The GPS receiver outputs positioning information indicating the result of determination of the position of the vehicle 2 based on the GPS signals to the vehicle motion recorder via an in-vehicle network at predetermined intervals. Instead of the GPS receiver, the vehicle 2 may include a receiver conforming to another satellite positioning system. In this case, the receiver determines the position of the vehicle 2.

The vehicle motion recorder includes, for example, a processor and a memory. Every time a motion sensor signal is obtained from the vehicle motion sensor, the processor of the vehicle motion recorder associates the motion sensor signal with the position of the vehicle 2 indicated by positioning information obtained from the GPS receiver at the time closest to the time of acquisition of the motion sensor signal. The processor arranges individual motion sensor signals, each associated with the position of the vehicle 2, in order of the acquisition time to generate vehicle motion information, and stores the generated vehicle motion information in the memory of the vehicle motion recorder. Thus the generated vehicle motion information also includes the trajectory of the vehicle 2, together with the motion sensor signals arranged in order of the acquisition time. The vehicle motion recorder may include identifying information of the vehicle 2 in the vehicle motion information.

The vehicle 2 may include a camera for taking pictures of a region around the vehicle 2. The camera may generate images representing the region around the vehicle 2 at predetermined intervals, and output the generated images to the vehicle motion recorder via the in-vehicle network. In the memory of the vehicle motion recorder may be stored a map representing predetermined features on or around roads, such as lane lines or traffic signs. In this case, the processor of the vehicle motion recorder may compare an image received from the camera with the map to estimate a more accurate position of the vehicle 2, and associate the estimated position with a motion sensor signal.

To achieve this, the processor detects predetermined features represented in an image by inputting the image into a classifier that has been trained to detect the predetermined features. The processor then projects the detected features onto the map, based on an assumed position and travel direction of the vehicle 2, by referring to parameters of the camera, such as the orientation, the focal length, and the position at which the camera is mounted on the vehicle 2, and calculates the degree of matching between the projected features and the features represented in the map. While variously changing the assumed position and travel direction of the vehicle 2, the processor repeats projection of the features and calculation of the degree of matching, and estimates the actual position and travel direction of the vehicle 2 at the time of generation of the image to be the position and travel direction of the vehicle 2 for the case where the degree of matching is a maximum. The processor estimates the position of the vehicle 2 at the time of acquisition of an individual motion sensor signal, based on the position of the vehicle 2 at the time of generation of an individual image.

The processor may further include individual images and the positions and travel directions of the vehicle 2 at the times of generation of the individual images, in the vehicle motion information.

At a predetermined timing, the vehicle motion recorder outputs the generated vehicle motion information to the wireless communication terminal. The predetermined timing may be, for example, the timing when the ignition switch of the vehicle 2 is turned off, or timings at certain intervals (e.g., intervals of 30 minutes to 1 hour) after the ignition switch of the vehicle 2 is turned on. Alternatively, collection region information indicating a target region for collecting vehicle motion information may be notified in advance to the vehicle 2 by the server 3 via the communication network 4 and the wireless base station 5. In this case, the vehicle motion recorder may determine the timing when the vehicle 2 moves outside the target region for collection as the predetermined timing, by referring to the collection region information and positioning information.

The wireless communication terminal is a device to execute a wireless communication process conforming to a predetermined standard of wireless communication, and accesses, for example, the wireless base station 5 to connect to the server 3 via the wireless base station 5 and the communication network 4. The wireless communication terminal generates an uplink radio signal including vehicle motion information received from the vehicle motion recorder, and transmits the uplink radio signal to the wireless base station 5 to transmit the vehicle motion information to the server 3. Further, the wireless communication terminal receives a downlink radio signal from the wireless base station 5, and passes collection region information from the server 3 included in the radio signal to the vehicle motion recorder.

Figure 2:
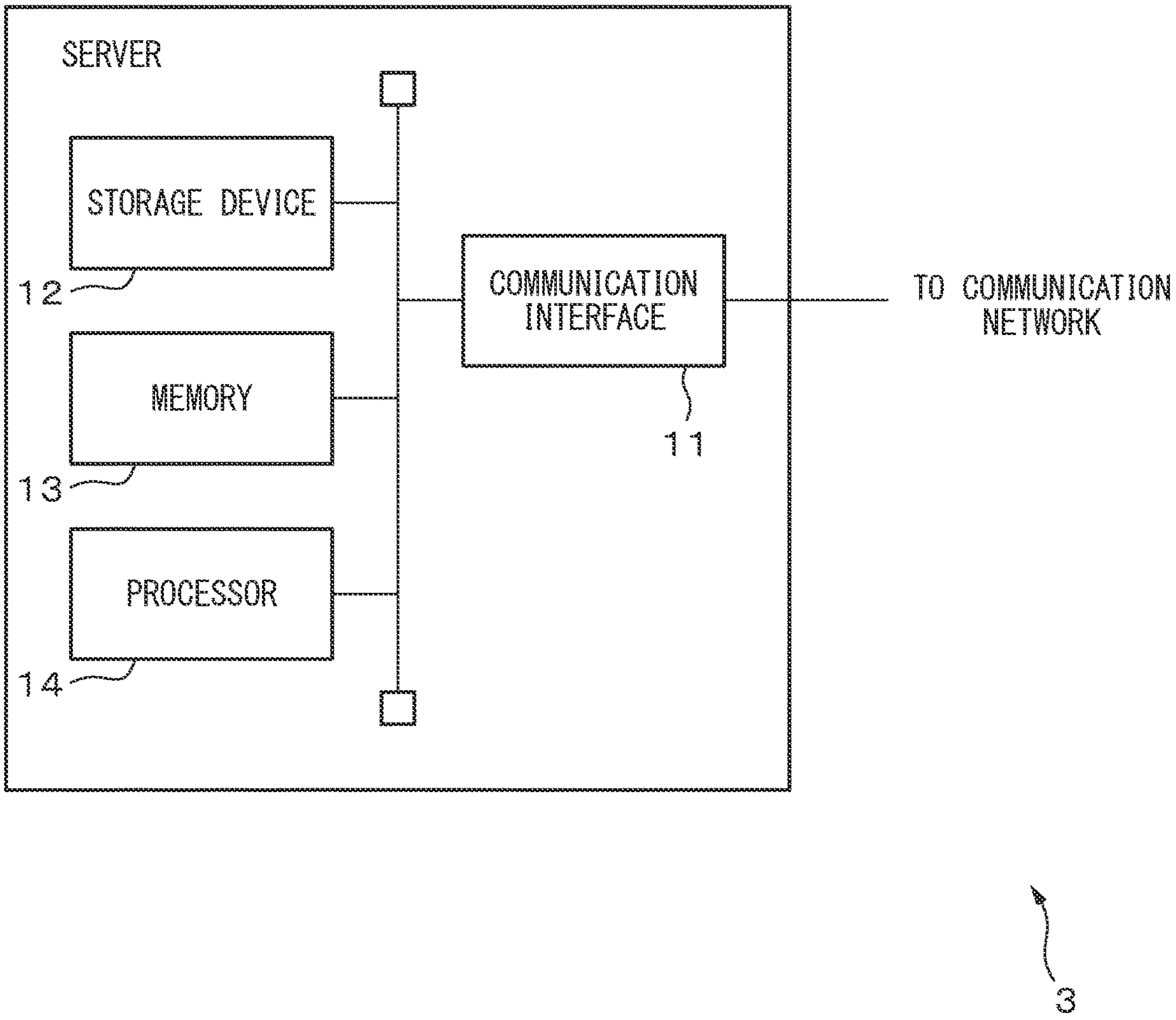
FIG. 2 illustrates the hardware configuration of a server, which is an example of the vehicle motion scoring device.

The following describes the server 3, which is an example of the vehicle motion scoring device. FIG. 2 illustrates the hardware configuration of the server 3, which is an example of the vehicle motion scoring device. The server 3 includes a communication interface 11, a storage device 12, a memory 13, and a processor 14. The communication interface 11, the storage device 12, and the memory 13 are connected to the processor 14 via a signal line. The server 3 may further include an input device, such as a keyboard and a mouse, and a display device, such as a liquid crystal display.

The communication interface 11, which is an example of a communication unit, includes an interface circuit for connecting the server 3 to the communication network 4. The communication interface 11 is configured to be communicable with the vehicle 2 via the communication network 4 and the wireless base station 5. More specifically, the communication interface 11 passes to the processor 14 vehicle motion information received from the vehicle 2 via the wireless base station 5 and the communication network 4. Further, the communication interface 11 transmits collection region information received from the processor 14 to the vehicle 2 via the communication network 4 and the wireless base station 5.

The storage device 12, which is an example of a storage unit, includes, for example, a hard disk drive, or an optical medium and an access device therefor, and stores various types of data and information used in a vehicle motion scoring process. For example, the storage device 12 stores vehicle motion information received from each vehicle 2. The storage device 12 also stores a map and information for identifying a predetermined road section that is a target for the vehicle motion scoring process. The information for identifying a predetermined road section includes, for example, a link ID for identifying the road section represented in the map or positional information of both ends of the road section. The storage device 12 may further store a computer program for the processor 14 to execute the vehicle motion scoring process.

The memory 13, which is another example of a storage unit, includes, for example, nonvolatile and volatile semiconductor memories. The memory 13 temporarily stores various types of data generated during execution of the vehicle motion scoring process.

The processor 14 includes one or more central processing units (CPUs) and a peripheral circuit thereof. The processor 14 may further include another operating circuit, such as a logic-arithmetic unit or an arithmetic unit. Every time vehicle motion information is received from one of the vehicles 2, the processor 14 stores the received vehicle motion information in the storage device 12. In addition, the processor 14 executes the vehicle motion scoring process. Further, the processor 14 generates collection region information, based on information for specifying a collection target region inputted via the input device, and delivers the generated collection region information to each vehicle 2 via the communication interface 11.

Figure 3:
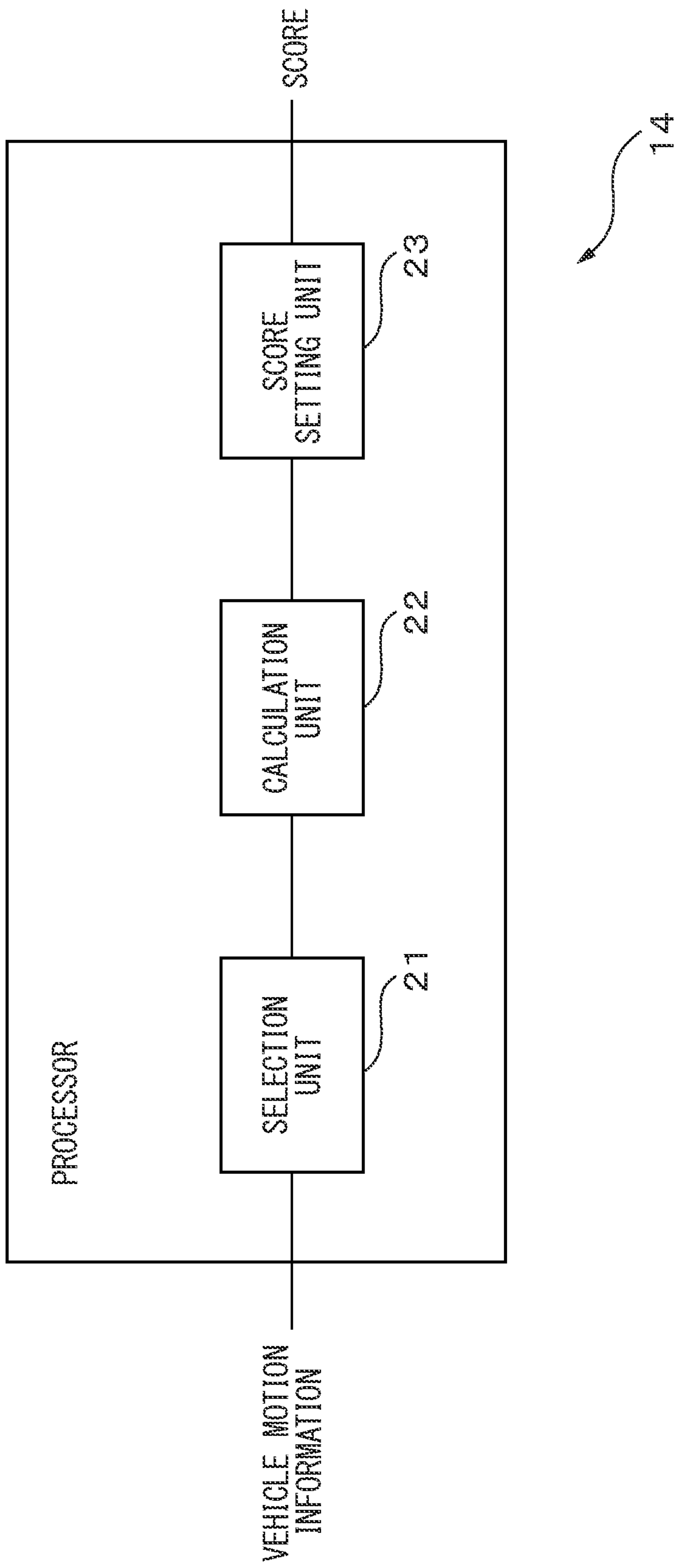
FIG. 3 is a functional block diagram of a processor, related to a vehicle motion scoring process.

FIG. 3 is a functional block diagram of the processor 14, related to the vehicle motion scoring process. The processor 14 includes a selection unit 21, a calculation unit 22, and a score setting unit 23. These units included in the processor 14 are functional modules, for example, implemented by a computer program executed by the processor 14, or may be dedicated operating circuits provided in the processor 14.

The selection unit 21 selects a piece of vehicle motion information corresponding to travel of the vehicle 2 along a predetermined road section that is a target for the vehicle motion scoring process, from pieces of vehicle motion information collected from each vehicle 2 and stored in the storage device 12. The predetermined road section is identified, for example, by referring to information for identifying the road section; the information is inputted from the input device or another device connected to the server 3 via a communication channel and stored in the storage device 12.

The selection unit 21 reads the information for identifying the predetermined road section from the storage device 12. By referring to the information, the selection unit 21 determines, for each piece of vehicle motion information, whether some of the positions of the vehicle 2 at the times of acquisition of individual motion sensor signals included in the vehicle motion information is within the predetermined road section. The selection unit 21 selects a piece of vehicle motion information such that the positions of the vehicle 2 at the times of acquisition of some of the motion sensor signals are within the predetermined road section. From each selected piece of vehicle motion information, the selection unit 21 further selects pairs of an individual position of the vehicle 2 included in the predetermined road section and a motion sensor signal associated with the position, as vehicle motion information corresponding to travel of the vehicle 2 along the predetermined road section.

The selection unit 21 notifies the calculation unit 22 and the score setting unit 23 of the vehicle motion information corresponding to travel of the vehicle 2 along the predetermined road section.

The calculation unit 22 calculates at least one of the degree of variations in the distribution of a motion index or a maximum of the motion index, based on the vehicle motion information corresponding to travel of the vehicle 2 along the predetermined road section and notified by the selection unit 21. As described above, the motion index includes at least one of acceleration or deceleration of the vehicle 2, the amount of change in the acceleration or deceleration per unit time, the amount of change in a travel direction of the vehicle 2, or the amount of change in the travel direction of the vehicle 2 per unit time. As the degree of variations in the motion index, the calculation unit 22 calculates, for example, the standard deviation or the variance of the motion index. When the motion index includes two or more of the above-mentioned elements, such as acceleration or deceleration, the calculation unit 22 calculates an average or a maximum of the standard deviations or the variances of the respective elements, as the degree of variations in the motion index, and further calculates maximums of the respective elements.

The calculation unit 22 calculates the degree of variations in front-back G or left-right G included in the vehicle motion information, as the degree of variations in the acceleration or deceleration of the vehicle 2. The calculation unit 22 also calculates a maximum of front-back G or left-right G included in the vehicle motion information, as a maximum of the acceleration or deceleration of the vehicle 2. Alternatively, the calculation unit 22 may calculate the degree of variations in the accelerator position or brake pedal force included in the vehicle motion information, as the degree of variations in the acceleration or deceleration of the vehicle 2. The calculation unit 22 may further calculate a maximum of the accelerator position or brake pedal force included in the vehicle motion information, as a maximum of the acceleration or deceleration of the vehicle 2.

For each pair of two temporally successive values of the front-back G included in the vehicle motion information, the calculation unit 22 may calculate the difference between these values or a normalized value that is the difference between these values divided by the interval of acquisition of the motion sensor signals, as the amount of change in front-back G per unit time. The calculation unit 22 then calculates the degree of variations and the maximum of the amount of change in front-back G per unit time, as the degree of variations and the maximum of the amount of change in the acceleration or deceleration per unit time. Similarly, for each pair of two temporally successive values of the left-right G, accelerator position, or brake pedal force included in the vehicle motion information, the calculation unit 22 may calculate the difference between these values or a normalized value that is the difference between these values divided by the interval of acquisition of the motion sensor signals, as the amount of change in the acceleration or deceleration per unit time. The calculation unit 22 then calculates the degree of variations and the maximum of the amount of change in the acceleration or deceleration per unit time.

The calculation unit 22 further calculates the degree of variations and the maximum of the steering angle or angular velocity in the yaw direction included in the vehicle motion information, as the degree of variations and the maximum of the amount of change in the travel direction of the vehicle 2.

Further, for each pair of two temporally successive values of the steering angle or angular velocity in the yaw direction included in the vehicle motion information, the calculation unit 22 may calculate the difference between these values or a normalized value that is the difference between these values divided by the interval of acquisition of the motion sensor signals, as the amount of change in the travel direction of the vehicle 2 per unit time. The calculation unit 22 then calculates the degree of variations and the maximum of the amount of change in the travel direction of the vehicle 2 per unit time.

The calculation unit 22 notifies the score setting unit 23 of at least one of the degree of variations in the distribution of the motion index or the maximum of the motion index calculated for the vehicle motion information.

The score setting unit 23 sets a score of the vehicle motion information corresponding to travel of the vehicle 2 along the predetermined road section and notified by the selection unit 21. In the present embodiment, the score setting unit 23 sets a score so that the score decreases as the degree of variations in the distribution of the motion index or the maximum of the motion index calculated for the vehicle motion information increases. Specifically, the score setting unit 23 determines a score corresponding to the calculated degree of variations or maximum by referring to a reference table representing the relationship between a calculated value of the degree of variations in the distribution of the motion index or the maximum of the motion index and a score. When both the degree of variations and the maximum are calculated, the reference table is prepared so as to represent the relationship between a pair of the degree of variations and the maximum and a score. In the case where the motion index includes multiple elements and where a maximum is calculated for each element, the reference table is prepared so as to represent the relationship between maximums of the respective elements and a score. Alternatively, the score setting unit 23 may determine a score by substituting the calculated degree of variations or maximum into a mathematical expression representing the relationship between a calculated value of the degree of variations in the distribution of the motion index or the maximum of the motion index and a score. When both the degree of variations and the maximum are calculated, the mathematical expression is prepared so as to represent the relationship between a pair of the degree of variations and the maximum and a score. In the case where the motion index includes multiple elements and where a maximum is calculated for each element, the mathematical expression is prepared so as to represent the relationship between maximums of the respective elements and a score. Such a reference table or a mathematical expression may be prestored in the storage device 12.

The score setting unit 23 stores the score that is set to the vehicle motion information in the storage device 12 in association with the vehicle motion information. Alternatively, the score setting unit 23 may output the set score and the vehicle motion information to another device via the communication interface 11. In this case, the score setting unit 23 may output vehicle motion information having a score not less than a predetermined threshold to another device via the communication interface 11, and delete vehicle motion information having a score less than the predetermined threshold from the storage device 12.

Figure 4A:
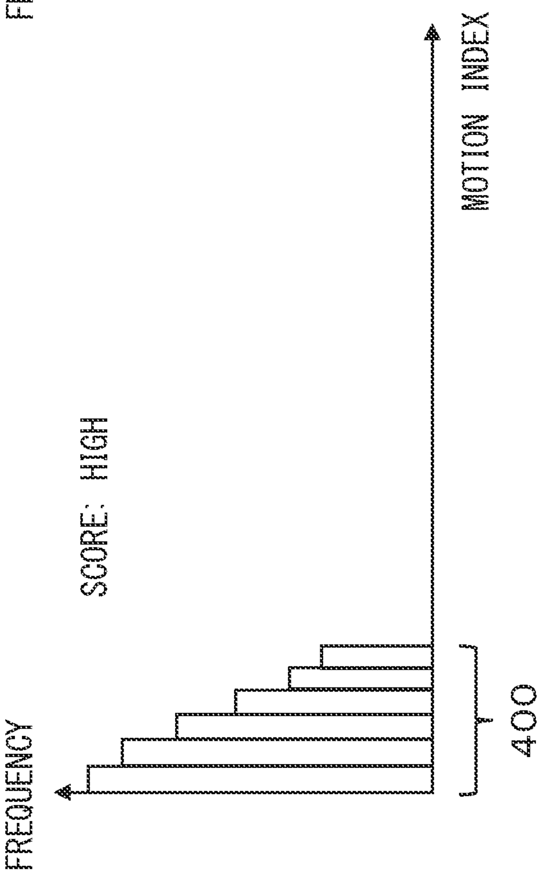
FIG. 4A illustrates the relationship between the distribution of a motion index and a score.
Figure 4B:
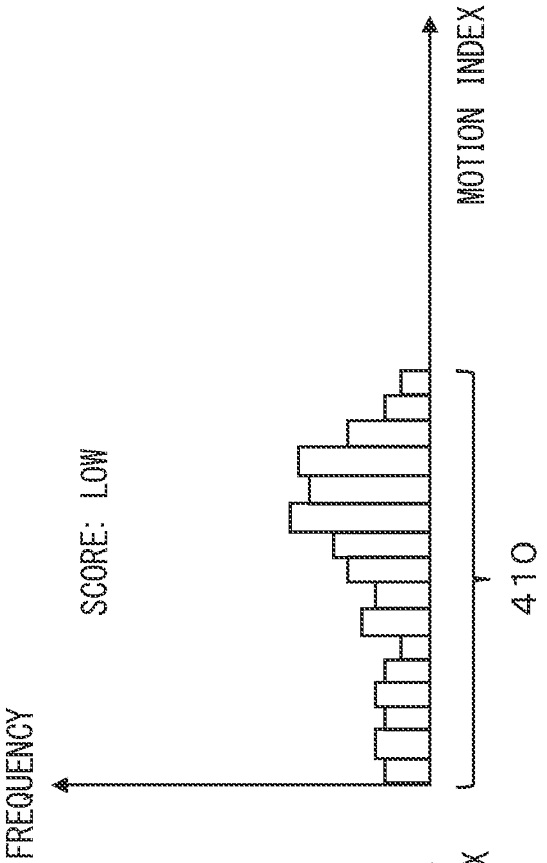
FIG. 4B illustrates the relationship between the distribution of a motion index and a score.

FIGS. 4A and 4B illustrate the relationship between the distribution of a motion index and a score. In FIGS. 4A and 4B, the abscissa represents a motion index, and the ordinate the frequency of the motion index.

The distribution 400 of a motion index illustrated in FIG. 4A is concentrated on relatively low values. Thus the degree of variations is low, and the maximum of the motion index is also relatively low. When the degree of variations in the distribution of the motion index and the maximum of the motion index are low, as in this case, it is assumed that the vehicle 2 has not engaged in unstable motion, such as excessive acceleration or deceleration or swerving. In other words, it is assumed that the driver of the vehicle 2 has not driven recklessly. Accordingly, a relatively high score is set to the vehicle motion information indicating such a distribution of a motion index.

In contrast, the distribution 410 of a motion index illustrated in FIG. 4B relatively spreads from a low value to a high value. Thus the degree of variations is high, and the maximum of the motion index is relatively high. When the degree of variations in the distribution of the motion index or the maximum of the motion index is high, as in this case, it is assumed that the vehicle 2 has engaged in unstable motion. Accordingly, a relatively low score is set to the vehicle motion information indicating such a distribution of a motion index.

Figure 5:
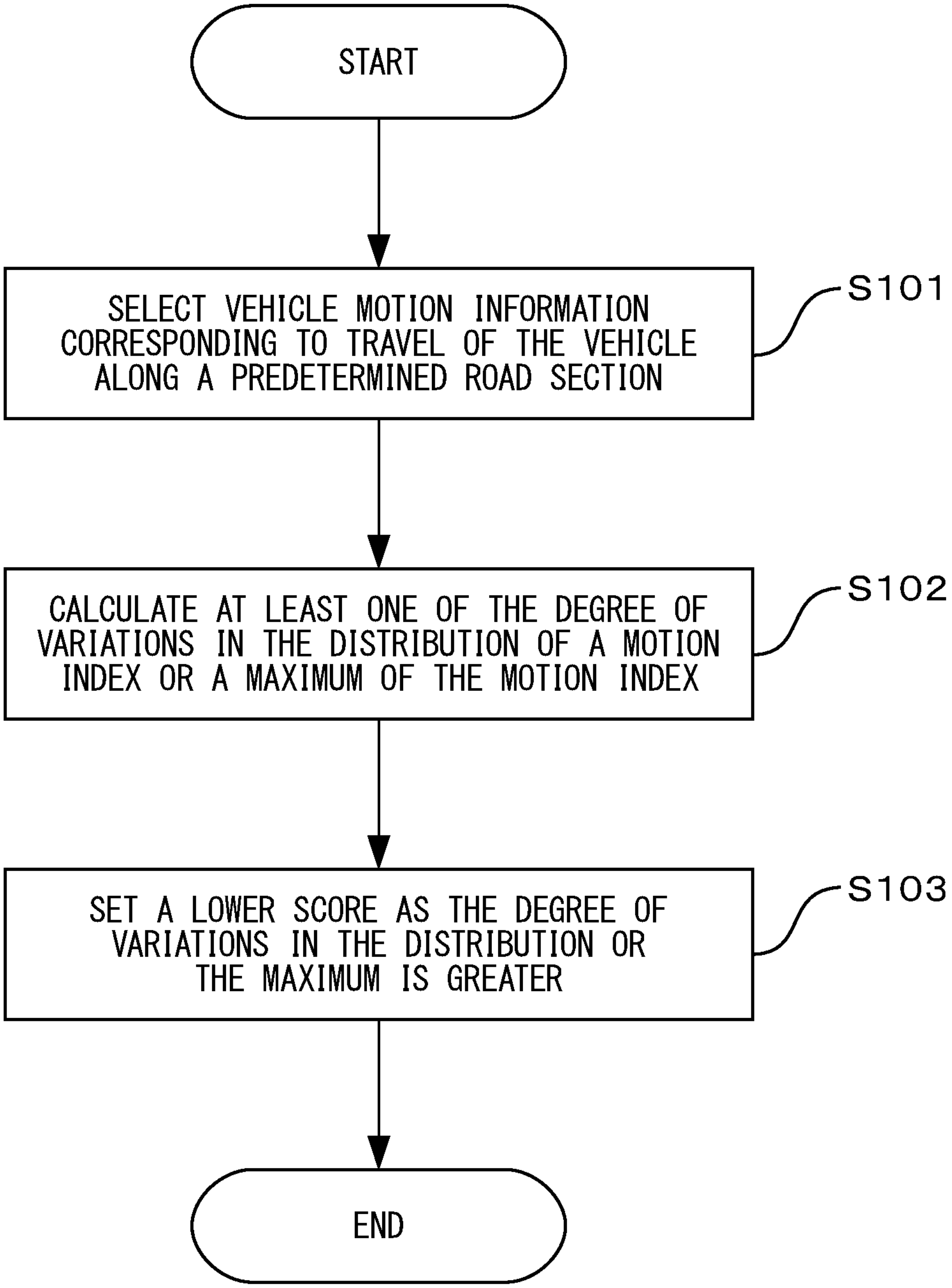
FIG. 5 is an operation flowchart of the vehicle motion scoring process.

FIG. 5 is an operation flowchart of the vehicle motion scoring process executed by the server 3. The processor 14 of the server 3 executes the vehicle motion scoring process in accordance with the operation flowchart described below.

The selection unit 21 of the processor 14 selects a piece of vehicle motion information corresponding to travel of the vehicle 2 along a predetermined road section that is a target for the vehicle motion scoring process, from pieces of vehicle motion information stored in the storage device 12 (step S101).

The calculation unit 22 of the processor 14 calculates at least one of the degree of variations in the distribution of a motion index or a maximum of the motion index, based on the selected piece of vehicle motion information (step S102).

The score setting unit 23 of the processor 14 sets a score of the selected piece of vehicle motion information so that the score decreases as the degree of variations in the distribution of the motion index or the maximum of the motion index calculated for the vehicle motion information increases (step S103). The processor 14 then terminates the vehicle motion scoring process.

As described above, the vehicle motion scoring device calculates at least one of the degree of variations in the distribution of a motion index included in vehicle motion information or a maximum of the motion index. The vehicle motion scoring device sets a lower score to the vehicle motion information as the degree of variations in the distribution of the motion index or the maximum of the motion index is greater. Thus the vehicle motion scoring device can score motion of the vehicle appropriately, and set the score to vehicle motion information.

The processor 14 may train the control model used for autonomous driving control of a vehicle as described above, based on individual pieces of vehicle motion information to which scores are set. More specifically, the processor 14 may train the control model in accordance with a predetermined supervised learning algorithm, such as backpropagation, using only pieces of vehicle motion information having scores not less than a certain value, as training data. The processor 14 may then deliver the trained control model to each vehicle 2 or another device via the communication interface 11.

The computer program for causing a computer to achieve the functions of the units included in the processor of the vehicle motion scoring device according to the embodiment or modified examples may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present disclosure.

What is claimed is:

1. A vehicle motion scoring device for a vehicle comprising:

a processor configured to:

calculate at least one of a degree of variations in a distribution of a motion index or a maximum of the motion index, based on vehicle motion information indicating motion of the vehicle traveling along a predetermined road section, the motion index including at least one of acceleration or deceleration of the vehicle, an amount of change in the acceleration or deceleration of the vehicle per unit time, an amount of change in a travel direction of the vehicle, or an amount of change in the travel direction of the vehicle per unit time, set a lower score to the vehicle motion information as a calculated value of the degree of variations in the distribution of the motion index or the maximum of the motion index is greater, train a control model with a predetermined supervised learning algorithm using only pieces of the vehicle motion information having scores equal to or above a predetermined value as a training data, deliver the trained control model to the vehicle for autonomous driving control of the vehicle, and in response, the vehicle utilizes the trained control model in the autonomous driving control.

2. A method for scoring vehicle motion, comprising:

calculating at least one of a degree of variations in a distribution of a motion index or a maximum of the motion index, based on vehicle motion information indicating motion of a vehicle traveling along a predetermined road section, the motion index including at least one of acceleration or deceleration of the vehicle, an amount of change in the acceleration or deceleration of the vehicle per unit time, an amount of change in a travel direction of the vehicle, or an amount of change in the travel direction of the vehicle per unit time;

setting a lower score to the vehicle motion information as a calculated value of the degree of variations in the distribution of the motion index or the maximum of the motion index is greater;

training a control model with a predetermined supervised learning algorithm using only pieces of the vehicle motion information having scores equal to or above a predetermined value as a training data;

delivering the trained control model to the vehicle for autonomous driving control of the vehicle; and in response, the vehicle utilizing the trained control model in the autonomous driving control.

3. A non-transitory recording medium that stores a computer program for scoring vehicle motion, the computer program causing a computer to execute a process comprising:

calculating at least one of a degree of variations in a distribution of a motion index or a maximum of the motion index, based on vehicle motion information indicating motion of a vehicle traveling along a predetermined road section, the motion index including at least one of acceleration or deceleration of the vehicle, an amount of change in the acceleration or deceleration of the vehicle per unit time, an amount of change in a travel direction of the vehicle, or an amount of change in the travel direction of the vehicle per unit time;

setting a lower score to the vehicle motion information as a calculated value of the degree of variations in the distribution of the motion index or the maximum of the motion index is greater;

training a control model with a predetermined supervised learning algorithm using only pieces of the vehicle motion information having scores equal to or above a predetermined value as a training data;

delivering the trained control model to the vehicle for autonomous driving control of the vehicle; and in response, the vehicle utilizing the trained control model in the autonomous driving control.

* * * * *